United States Patent
Bernhardt et al.

(10) Patent No.: US 12,123,645 B2
(45) Date of Patent: Oct. 22, 2024

(54) INSTALLATION AND METHOD FOR PURIFYING AND LIQUEFYING NATURAL GAS

(71) Applicant: L'Air Liquide, Société Anonyme pour l'Etude et l'Exploitation des Procédés Georges Claude, Paris (FR)

(72) Inventors: Jean-Marc Bernhardt, Sassenage (FR); Golo Zick, Sassenage (FR); Rémi Nicolas, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 762 days.

(21) Appl. No.: 17/277,437

(22) PCT Filed: Sep. 12, 2019

(86) PCT No.: PCT/FR2019/052106
§ 371 (c)(1),
(2) Date: Mar. 18, 2021

(87) PCT Pub. No.: WO2020/058602
PCT Pub. Date: Mar. 26, 2020

(65) Prior Publication Data
US 2021/0356204 A1   Nov. 18, 2021

(30) Foreign Application Priority Data
Sep. 20, 2018 (FR) ........................................ 1858523

(51) Int. Cl.
*F25J 1/02* (2006.01)
*F25J 1/00* (2006.01)

(52) U.S. Cl.
CPC ........... *F25J 1/0022* (2013.01); *F25J 1/0225* (2013.01); *F25J 1/023* (2013.01); *F25J 1/0242* (2013.01);
(Continued)

(58) Field of Classification Search
CPC ........ F25J 1/0022; F25J 1/0225; F25J 1/0227; F25J 1/023; F25J 1/0242; F25J 1/0245;
(Continued)

(56) References Cited

U.S. PATENT DOCUMENTS 4,445,916 A * 5/1984 Newton ................ F25J 1/0022
62/621
5,615,561 A * 4/1997 Houshmand ........... F25J 3/0238
62/611

(Continued)

FOREIGN PATENT DOCUMENTS

AU   2016 428816   5/2018
EP   2 562 501     2/2013
(Continued)

OTHER PUBLICATIONS

International Search Report for corresponding PCT/FR2019/052106, Jan. 14, 2020.

*Primary Examiner* — Eric S Ruppert
*Assistant Examiner* — Hans R Weiland
(74) *Attorney, Agent, or Firm* — Elwood L. Haynes

(57) ABSTRACT

An installation and method for purifying and liquefying natural gas having, arranged in series, an adsorption purification unit, a unit for separating hydrocarbons by refrigeration, and a liquefier. The installation has a gas power plant for combined production of heat and electricity by hydrocarbon combustion. The installation has at least one electrical member, with the power plant being electrically connected to at least one of the electrical members in order to supply them with electrical energy.

13 Claims, 1 Drawing Sheet

(52) U.S. Cl.
CPC ........... *F25J 1/0245* (2013.01); *F25J 1/0275* (2013.01); *F25J 1/0284* (2013.01); *F25J 2205/04* (2013.01); *F25J 2205/70* (2013.01); *F25J 2210/06* (2013.01); *F25J 2220/64* (2013.01); *F25J 2220/66* (2013.01); *F25J 2260/60* (2013.01); *F25J 2270/906* (2013.01)

(58) Field of Classification Search
CPC ...... F25J 1/0275; F25J 1/0284; F25J 2205/04; F25J 2205/70; F25J 2210/06; F25J 2220/64; F25J 2220/66; F25J 2260/60; F25J 2270/906
See application file for complete search history.

(56) References Cited

U.S. PATENT DOCUMENTS

| | | | | |
|---|---|---|---|---|
| 6,324,867 | B1 * | 12/2001 | Fanning | ................ F25J 1/0292 62/912 |
| 2003/0037672 | A1 * | 2/2003 | Sircar | ................ B01D 53/0462 96/121 |
| 2010/0212329 | A1 | 8/2010 | Bridgwood | |
| 2010/0313597 | A1 * | 12/2010 | Bridgwood | ............ F25J 1/0242 62/612 |
| 2013/0263624 | A1 | 10/2013 | Vandor | |
| 2013/0269523 | A1 | 10/2013 | Berhnardt et al. | |
| 2014/0260251 | A1 | 9/2014 | Shapot et al. | |
| 2014/0305160 | A1 | 10/2014 | Chong et al. | |
| 2016/0116209 | A1 * | 4/2016 | Nagao | ..................... F25J 1/023 62/53.2 |
| 2018/0209728 | A1 | 7/2018 | Iurisci et al. | |

FOREIGN PATENT DOCUMENTS

| | | |
|---|---|---|
| EP | 2 212 402 | 4/2017 |
| FR | 2 969 008 | 6/2012 |
| JP | 2010 532796 | 10/2010 |
| WO | WO 2008 139527 | 7/2010 |
| WO | WO 2018 083747 | 5/2018 |

* cited by examiner

INSTALLATION AND METHOD FOR PURIFYING AND LIQUEFYING NATURAL GAS

CROSS REFERENCE TO RELATED APPLICATIONS

This application is a 371 of International Application No. PCT/FR2019/052106, filed Sep. 12, 2019, which claims priority to French Patent Application No. 1858523, filed Sep. 20, 2018, the entire contents of which are incorporated herein by reference.

BACKGROUND

The invention relates to a facility and process for purifying and liquefying natural gas.

The invention relates more particularly to a facility for purifying and liquefying natural gas comprising, arranged in series, an adsorption purification unit, a unit for separating hydrocarbon(s) by refrigeration and a liquefier.

In view of its liquefaction, the methane must first be purified of the carbon dioxide that it contains in proportions of the order of 1% to 4%.

The final carbon dioxide purification may be carried out in the same way as on biogas units ("PSA" or "PTSA" technology, i.e. pressure swing adsorption device or pressure-temperature swing adsorption device).

In the case of a gas source originating from a pressurized distribution network, heavy (C5+) hydrocarbons can also solidify during liquefaction and must be reduced to an acceptable concentration for the process.

The liquefier (for example of "turbo-Brayton" technology sold by the applicant) requires a large amount of electricity and also cold water for, in particular, the cooling between the compression stages. The colder the water, the more efficient the liquefaction system.

The PTSA device needs to be regenerated in order to remove unwanted components. When there is no gas available for the regeneration (nitrogen for example), the purified gas at the outlet of one cylinder is generally used in order to circulate through the adjacent cylinder in regeneration. This gas will be loaded with the impurities stored in the adsorbent and will therefore no longer be usable in the process. It can be burnt in the flare or in user applications of the facility.

The heavy hydrocarbon compounds removed from the gas will also have to be treated and cannot be discharged into the atmosphere.

If the liquefier site is isolated or does not have the infrastructure to connect to the electricity grid, it is necessary to generate its own electricity locally. One solution is to burn methane from the network or from the source in a heat engine operating an electricity generator. This equipment (CHP=combined power plant with cogeneration by combustion of a hydrocarbon) also makes it possible to generate heat (in particular above 100° C.).

The purification of methane with a view to its liquefaction is a known process. In the case of biomethane derived from biogas purification (methanization process), the final purification before liquefaction makes it possible to eliminate the compounds that can solidify such as carbon dioxide (1% to 3%) and water (trace amounts). Certain documents describe a cooling of the purification step and heat recovery for the regeneration step (cf. FR2969008A).

The purification of heavy hydrocarbons in methane is also known. Document EP2212402B1 describes a plant using an engine, an adsorption chiller and the use of the PTSA regeneration gas.

Document US2014260251 describes the recovery of heavy hydrocarbons in a gas-fired combined heat and power plant with cogeneration by combustion of hydrocarbons.

Known facilities do not make it possible to make the needs of these various known systems coincide in order to obtain an autonomous, efficient, flexible facility having limited discharges into the environment.

SUMMARY

One aim of the present invention is to overcome all or some of the aforementioned disadvantages of the prior art.

To this end, the facility according to the invention, moreover in accordance with the generic definition given in the preamble above, is essentially characterized in that the adsorption purification unit comprises an inlet intended to be connected to a gas source predominantly comprising natural gas, a first outlet for purified gas connected to an inlet of the unit for separating hydrocarbon(s) by refrigeration, a second outlet for effluent gases produced during the purification, the unit for separating hydrocarbon(s) by refrigeration comprising a first outlet for purified gas connected to an inlet of the liquefier and a second outlet for effluent gases enriched in hydrocarbons produced during purification by cooling, the facility comprising a gas-fired power plant for combined heat and power production by combustion of a hydrocarbon, said power plant comprising a fuel gas inlet connected to the second outlet of the adsorption purification unit and to the second outlet of the one unit for separating hydrocarbon(s) by refrigeration, the facility comprising at least one electrical member from among: a chiller and the liquefier, and in that the power plant is electrically connected to at least one of the electrical member(s) in order to supply the latter with electrical energy produced by the combustion of a hydrocarbon introduced at its inlet.

Furthermore, embodiments of the invention can comprise one or more of the following features:

the facility comprises a bypass line provided with a valve connecting the inlet of the adsorption purification unit to the inlet of the power plant, the bypass line being configured to allow the power plant to be supplied with fuel gas directly by the source, said power plant is configured to produce a given electric power as a function of the flow rate and the composition of the fuel gas introduced at its inlet, the adsorption purification unit and the unit for separating hydrocarbon(s) by refrigeration being configured to produce given flow rates of fuel gas at their outlets having compositions liable to fluctuate, the sum of these fuel gas flow rates having a combustion power lower than the combustion power needed to produce the electric power required by all the electrical members electrically powered by the power plant, the facility is configured to supply the power plant with the additional combustion power needed via a flow of fuel gas originating directly from the source via the bypass line, the facility comprises a chiller configured to extract heat or produce cold from heat, the power plant being configured to transfer heat to the chiller, the chiller being fluidically connected to the liquefier in order to transfer cold to the liquefier and recover heat from the liquefier via a coolant loop, the facility comprises a cooling member integrated into the gas absorption chiller or connected to the latter, the cooling member comprising in particular a coolant loop placed in heat exchange with the gas absorption chiller and cooled by a heat exchanger, the adsorption purification unit comprises several adsorbers which are mounted and parallel and operate in an alternating and staggered manner by carrying out each of the cycles comprising an adsorption phase, a depressurization phase, a regeneration phase, in particular with heating and a cooling phase, the adsorption purification unit comprises a circuit provided with valves that is configured to ensure, during a regeneration phase of each adsorber, a closed-loop circulation in the adsorber with a gas compressed in a circulator heated by a first heating member, the first heating member and the circulator are electrically powered and/or supplied with heat by the power plant and/or by an electricity grid and/or another electric source, the adsorption purification unit comprises a second heating member for heating the purified gas leaving each adsorber, the second heating member is electrically powered and/or supplied with heat by the power plant, the unit for separating hydrocarbon(s) by refrigeration comprises, arranged in series, a first exchanger for cooling the gas, a second exchanger for cooling the gas, a separator vessel for separating the gas and liquid phases, the gas from the line for recovering gas from the separator vessel is placed in heat exchange with an exchanger for cooling the gas from the unit for purifying hydrocarbon(s) by refrigeration. The invention also relates to a process for purifying liquefying natural gas using a facility in accordance with any one of the characteristics above or below, the inlet of the adsorption purification unit of which is supplied by a gas source predominantly comprising natural gas, the process comprising:

a step of supplying fuel gas to the power plant via the outlet of the adsorption purification unit and via the outlet of the unit for purifying hydrocarbon(s) by refrigeration and possibly directly via the source, a step of electric power generation by the power plant, a step of electrically powering the electrical member(s) of the facility with the power generated by the power plant.

According to other possible particular features:

the process comprises a step of regulating the flow rate of fuel gas supplying the power plant that originates directly from the source, the liquefaction power, i.e. the amount of gas liquefied by the liquefier can be monitored and in particular can be controlled in a maximum or nominal liquefaction operating configuration or in at least one reduced, in particular non-zero minimum, liquefaction operating configuration, corresponding for example to ten percent of the maximum liquefaction power of the liquefier, in the reduced liquefaction operating configuration, the process comprising, with respect to the maximum or nominal liquefaction operating configuration, a step of reducing at least one flow rate from among: the flow rate of fuel gas produced at the outlet of the adsorption purification unit, the flow rate of gas produced at the outlet of the unit for separating hydrocarbon(s) by refrigeration and the flow rate of fuel gas from the source directly supplying the power plant.

The invention may also relate to any alternative device or process comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
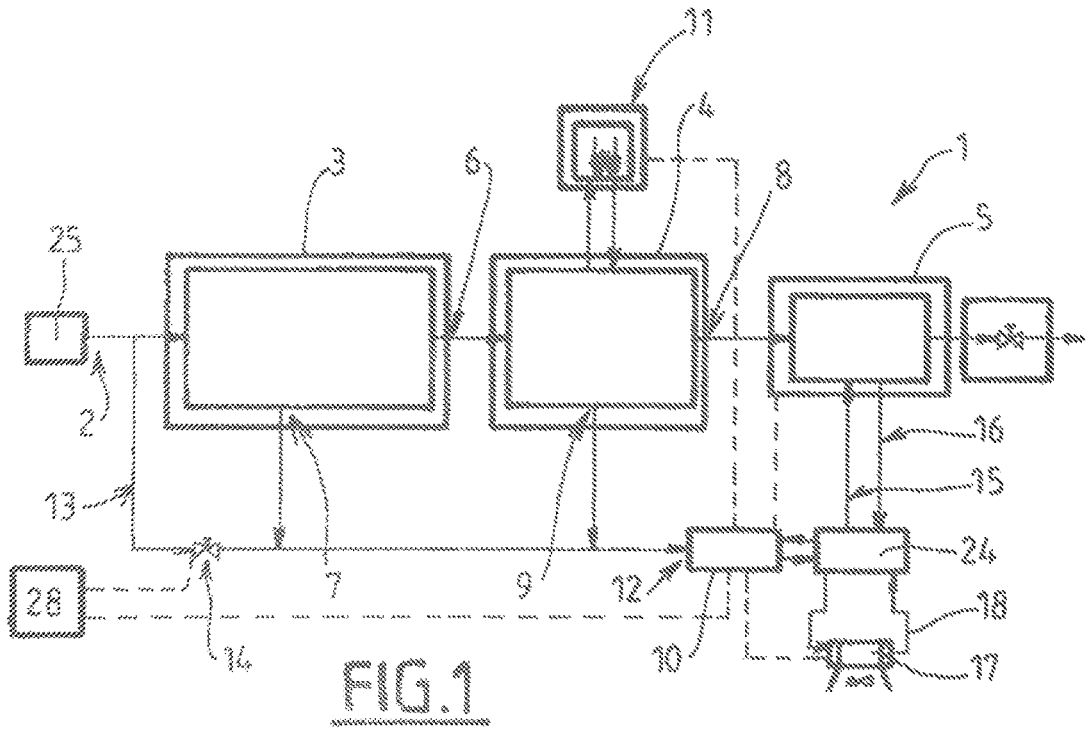
FIG. 1 represents a schematic and partial view illustrating one example of the structure and operation of a facility according to the invention.

The example of a facility for purifying and liquefying natural gas illustrated in FIG. 1 comprises, arranged in series, an adsorption purification unit 3, a unit 4 for separating hydrocarbon(s) by refrigeration and a liquefier 5.

The adsorption purification unit 3 comprises, for example, a PTSA device. The PTSA device comprises, for example, several cylinders of adsorbent (for example zeolites) arranged in parallel and operating in an alternating manner (cf. below in more detail). The unit 4 for separating hydrocarbon(s) by refrigeration is optional and comprises, for example, a conventional apparatus which separates heavy hydrocarbons (five carbon atoms and above, for example). For example, this apparatus comprises a device of the type having refrigeration and separation by condensation.

The adsorption purification unit 3 comprises an inlet 2 intended to be connected to a gas source 25 predominantly comprising natural gas, a first outlet 6 for purified gas connected to an inlet of the unit 4 for separating hydrocarbon(s) by refrigeration and a second outlet 7 for effluent gases produced during the purification.

The unit 4 for separating hydrocarbon(s) by refrigeration comprises a first outlet 8 for purified gas connected to an inlet of the liquefier 5 and a second outlet 9 for effluent gases enriched in hydrocarbons produced during the purification by cooling.

The facility 1 comprises a gas-fired power plant 10 for the combined production of heat and power by combustion of a hydrocarbon. The power plant 10 comprises a fuel gas inlet 12 connected to the second outlet 7 of the adsorption purification unit 3 and to the second outlet 9 of the one unit 4 for separating hydrocarbon(s) by refrigeration.

The facility further comprises at least one electrical member from among: a chiller 11, the liquefier 5 and optionally another chiller 17, the purification unit 3 or any member making up the facility 1.

The power plant 10 is electrically connected to at least one electrical member 11, 5, 17, 3 of the facility 1 in order to supply this or these member(s) with electric power produced by the combustion of a hydrocarbon introduced at its inlet 12.

That is to say that the effluents containing hydrocarbons resulting from the adsorption purification unit 3 and from the unit 4 for separating hydrocarbons by refrigeration are burned in the power plant 10 which produces electricity that is supplied to all or some of the electrical equipment of the facility.

As shown, the facility 1 preferably comprises a bypass line 13 provided with a valve 14 connecting the inlet 2 of the adsorption purification unit 3 (or the source 25 of gas to be purified) to the inlet 12 of the power plant 10.

The facility 1 and in particular the bypass line 13 is thus configured to enable the power plant 10 to be supplied with fuel gas directly from the source 25 of fuel gas to be purified.

Preferably, the power plant 10 is configured to produce a given electric power as a function of the flow rate and of the composition of the fuel gas introduced at its inlet. Thus, depending on the (known) composition and the (known) amount of the fuel gas which is supplied to the power plant 10, the latter produces a given amount of electric power.

The adsorption purification unit 3 and the unit 4 for separating hydrocarbon(s) by refrigeration are configured to produce given flow rates of fuel gas at their outlets 7, 9 having compositions liable to fluctuate. The sum of these fuel gas flow rates preferably has a combustion power lower than the combustion power needed to produce the electric power required by all the electrical members 11, 5, 17, 3 electrically powered by the power plant 10 (in nominal or normal operating mode).

That is to say, in normal operation, these effluents supplied to the power plant are insufficient for the power plant 10 to produce all the electricity required by the facility 1.

According to an advantageous particular feature, the facility 1 can be configured to supply the power plant 10 with the additional combustion power needed via a flow of fuel gas originating directly from the source via the bypass line 13.

That is to say that the regeneration gas flow rates of the adsorption (PTSA) purification unit 3 and the unit 4 for separating hydrocarbon(s) by refrigeration are sized to provide a useful amount of hydrocarbon which remains lower than the demand of the power plant 10 in order to meet the electricity requirements. The balance is provided by the bypass line 13.

Thus, when the gas liquefaction requirements decrease (flexibility), the electricity demand of the equipment of the facility and the demand for cold in the facility also decrease in proportion. This correlation between the amount of purified and liquefied gas and the electricity consumption is obtained in particular when using liquefier(s) with "turbo Brayton" technology mentioned above. The other electricity-consuming members (chiller 11, chiller 17, purification unit 3, etc.) may require an electrical power supply that is less correlated with the liquefaction requirements (almost constant for example). However, their impact is generally low on the total electric power required by the facility.

Thus, for example, the depressurization/regeneration of the cylinders of the purification unit 3 (PTSA, PSA, TSA or equivalent) will continue to provide the same flow rate of regeneration gas to the power plant 10 because this flow rate is linked to the size of the equipment and not to the flow rate of gas to be purified.

The flow rate of gas originating from the purification unit 4 (optional) is dependent on the flow rate of gas to be liquefied but generally represents a very small portion of the gas supplying the power plant 10.

The additional gas required for the power plant 10 originates from the source 25 and can be regulated by a pilot-operated valve 14 in order to automatically adjust the electric power produced and supplied to the users.

This architecture and this operation enable an overall optimization of the energy of the facility with maximum recovery of the heat produced by the power plant 10 in order to cool the cycle gas of the liquefier.

This also enables a limitation of the regeneration gas of the purification unit 4 in order to maintain the performance of the facility 1 in reduced regime (i.e. when the amounts liquefied are reduced compared to nominal operation).

This is particularly advantageous when there is no connection to an electricity grid available in order to discharge a potential excess of power/heat produced by the power plant 10.

As can be seen in FIG. 1, the facility 1 may comprise a chiller 24, 17, 18 configured to extract heat or produce cold from heat. The power plant 10 can be configured to transfer heat to the chiller 24 and the chiller 24 can be fluidically connected to the liquefier 5 in order to transfer 15 cold to the liquefier and recover 16 heat from the liquefier 5 via at least one coolant loop 15, 16.

The chiller 24 is for example an absorption chiller.

The gas absorption chiller 24 uses, for example, a heat source to extract heat, instead of the compressor usually used. This operating mode is advantageous when electricity is not readily available, or else when there is a practically free heat source.

This chiller 24 supplies cold for example to cool the working gas or the gas to be liquefied in the liquefier 5 between two compression stages and/or after the last compression stage.

Figure 2:
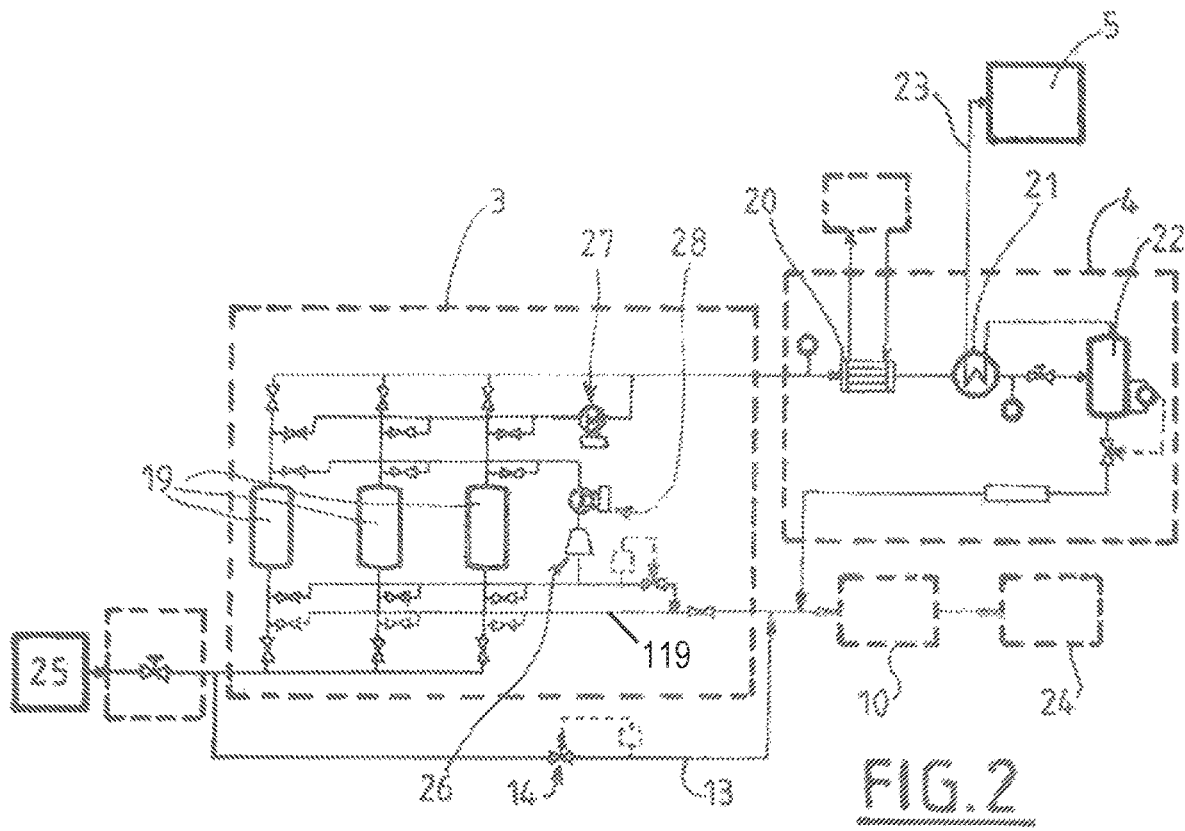
FIG. 2 represents a schematic and partial view illustrating a detail of the facility of FIG. 1.

As depicted in FIG. 2, the adsorption purification unit 3 may comprise several (in particular three) adsorbers 19 which are mounted and parallel and operate in an alternating and staggered manner by carrying out each of the cycles comprising an adsorption phase, a depressurization phase, a regeneration phase, in particular with heating and a cooling phase.

The adsorption purification unit 3 preferably comprises a circuit provided with valves that is configured to ensure, during a regeneration phase of each adsorber 19, a closed-loop circulation in the adsorber 19 with a gas compressed in a circulator 26 (compressor for example) heated by a first heating member 28.

A line 119 connects each adsorber 19 to the power plant 10 in order to discharge the regeneration gas with a view to the combustion thereof. This regeneration gas is added to the gas from the bypass line 13 supplying the power plant.

The first heating member 28 and/or the circulator 26 can be electrically operated and can be powered by the power plant 10.

The adsorption purification unit 3 may comprise a second member 27 for heating the purified gas leaving each adsorber 19. This second heating member 27 can also be electric and can be electrically powered or supplied thermally by the power plant 10.

The regeneration can use in particular external heat (hot water or the like, the calories of which can be supplied by the power plant 10).

Thus there is preferably heat input at two positions of the system:
  on the closed-loop gas circulation circuit (preferably after the circulator 28) for heating the adsorbent cylinder, and
  before the injection of pure gas into the cylinder for the end of the hot regeneration.

As illustrated in FIG. 2, the unit 4 for separating hydrocarbon(s) by refrigeration may comprise, arranged in series, a first exchanger 20 for cooling the gas, a second exchanger 21 for cooling the gas, a separator vessel 22 for separating the gas and liquid phases.

The facility 1 may comprise a line 23 for recovering gas from the separator vessel 22 and for transferring it to the inlet of the liquefier 5. The gas from this line 23 for recovering gas from the separator vessel 22 can be placed in heat exchange with an exchanger 21 for cooling the gas from the unit 4 for purifying hydrocarbon(s) by refrigeration.

The invention thus enables a combining and an advantageous sizing of the various constituent modules of the facility to ensure liquefaction in an energy-autonomous manner. The facility thus particularly advantageously regulates the flow rates of fuel gas (outlet 7 and/or 9) and directly from the source (via the valve 14) to enable the power plant 10 to produce the electrical energy required during a nominal operation while making it possible to limit this production during an operation which requires less electric power.

For example, the amount of gas liquefied by the liquefier 5 can be monitored and in particular can be controlled in a non-zero minimum liquefaction operating configuration corresponding for example to ten percent (or any other value between five and fifty percent) of the maximum liquefaction power of the liquefier 5. The facility can be controlled in particular to reduce particularly at least one flow rate from among: the flow rate of fuel gas produced at the outlet 7 of the adsorption purification unit 3, the flow rate of gas produced at the outlet 9 of the unit 4 for separating hydrocarbon(s) by refrigeration and the flow rate of fuel gas from the source 25 directly supplying the power plant 10. Thus, in the event of a high demand for electricity (maximum or nominal liquefaction) the power plant 10 receives sufficient fuel gas to ensure the electric power and, in the event of a lower liquefaction requirement, the electricity production can be lowered by reducing the supply of fuel gas to the power plant 10. This regulation can be carried out by controlling the amount of gas passing through the line 13 directly from the source 25 (via the valve 14 for example). This makes it possible to avoid unnecessary energy consumption.

The composition of the source gas may typically be as follows (from 80% to 99% of CH4, from 1% to 5% of CO2, from a few traces to 20% of CnHm). The composition of the gas at the effluent outlets 7, 9 of the purification unit and of the separation unit 4 can typically be from 50% to 99% of CH4, from 5% to 50% of CO2, from a few traces to 20% of CnHm for outlet 7 of adsorption purification unit 3 and from 50% to 99% of CH4, from a few traces to 200 ppm of CO2, from 5% to 90% of CnHm for outlet 9 of the unit 4 for separating hydrocarbon(s) by refrigeration.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A facility for purifying and liquefying natural gas comprising, arranged in series, an adsorption purification unit, a unit for separating hydrocarbon(s) by refrigeration, and a liquefier, the adsorption purification unit comprising an adsorption purification unit inlet configured to connect to a gas source predominantly comprising natural gas, a first adsorption purification unit outlet for purified gas connected to a refrigeration separation unit inlet, a second adsorption purification unit outlet for effluent gases produced during the purification, the unit for separating hydrocarbon(s) by refrigeration comprising a first refrigeration separation unit outlet for purified gas connected to a liquefier inlet of the liquefier and a second refrigeration separation unit outlet for effluent gases enriched in hydrocarbons produced during purification by cooling, the facility comprising a gas-fired power plant for combined heat and power production by combustion of a hydrocarbon, said power plant comprising a fuel gas inlet connected to the second adsorption purification unit outlet and to the second refrigeration separation unit outlet, the facility comprising at least one electrical member selected from the group consisting of: a chiller and the liquefier, the power plant being electrically connected to at least one of the electrical member(s) in order to supply the latter with electric power produced by the combustion of a hydrocarbon introduced at a power plant inlet, the facility comprising a bypass line provided with a valve connecting the absorption purification unit inlet to the power plant inlet, the bypass line being configured to allow the power plant to be supplied with fuel gas directly by the source, and in that said power plant is configured to produce a given electric power as a function of the flow rate and the composition of the fuel gas introduced at the power plant inlet and wherein the adsorption purification unit and the unit for separating hydrocarbon(s) by refrigeration are configured to produce given flow rates of fuel gas at their outlets having compositions liable to fluctuate, the sum of these fuel gas flow rates having a combustion power lower than the combustion power needed to produce the electric power required by all the electrical members electrically powered by the power plant and in that the facility is configured to supply the power plant with the additional combustion power needed via a flow of fuel gas originating directly from the source via the bypass line, and in that the adsorption purification unit comprises several adsorbers which are mounted and parallel and operate in an alternating and staggered manner by carrying out each of the cycles comprising an adsorption phase, a depressurization phase, a regeneration phase, in particular with heating and a cooling phase, the adsorption purification unit comprising a circuit provided with valves that is configured to ensure, during a regeneration phase of each adsorber, a closed-loop circulation in the adsorber with a gas compressed in a circulator heated by a first heating member.

2. The facility as claimed in claim 1, further comprising a chiller configured to extract heat or produce cold from heat, the power plant being configured to transfer heat to the chiller and in that the chiller is fluidically connected to the liquefier in order to transfer cold to the liquefier and recover heat from the liquefier via a coolant loop.

3. The facility as claimed in claim 2, further comprising a cooling member integrated into the gas absorption chiller or connected to the latter, the cooling member comprising in particular a coolant loop placed in heat exchange with the gas absorption chiller and cooled by a heat exchanger.

4. The facility as claimed in claim 1, wherein the first heating member and the circulator are electrically powered and/or supplied with heat by the power plant and/or by an electricity grid and/or another electric source.

5. The facility as claimed in claim 1, wherein the adsorption purification unit comprises a second heating member for heating the purified gas leaving each adsorber, and in that the second heating member is electrically powered and/or supplied with heat by the power plant.

6. The facility as claimed in claim 1, wherein the unit for separating hydrocarbon(s) by refrigeration comprises, arranged in series, a first exchanger for cooling the gas, a second exchanger for cooling the gas, and a separator vessel for separating the gas and liquid phases.

7. The facility as claimed in claim 6, further comprising a line for recovering gas from the separator vessel and for transferring it to the liquefier inlet.

8. The facility as claimed in claim 7, wherein the gas from the line for recovering gas from the separator vessel is placed in heat exchange with an exchanger for cooling the gas from the unit for purifying hydrocarbon(s) by refrigeration.

9. The facility as claimed in claim 1, wherein the adsorption purification unit comprises several adsorbers which are mounted and parallel and operate in an alternating and staggered manner by carrying out each of the cycles comprising an adsorption phase, a depressurization phase, a regeneration phase, in particular with heating and a cooling phase, the adsorption purification unit comprising a circuit provided with valves that is configured to ensure, during a regeneration phase of each adsorber, a closed-loop circulation in the adsorber with a gas compressed in a circulator heated by a first heating member.

10. The facility as claimed in claim 9, further comprising a line which connects each adsorber to the power plant in order to discharge the gas that has been used for the regeneration with a view to the combustion thereof.

11. A process for purifying liquefying natural gas using a facility in accordance with claim 1, the adsorption purification unit inlet of which is supplied by a gas source predominantly comprising natural gas, the process comprising a step of supplying fuel gas to the power plant via the adsorption unit outlet and via the refrigeration separation unit outlet and possibly directly via the source, a step of electric power generation by the power plant, a step of electrically powering the electrical member(s) of the facility with the power generated by the power plant.

12. The process as claimed in claim 10, further comprising a step of regulating the flow rate of fuel gas supplying the power plant that originates directly from the source.

13. The process as claimed in claim 11, wherein e, the amount of gas liquefied by the liquefier can be monitored and can be controlled in a maximum or nominal liquefaction operating configuration or in at least one reduced, liquefaction operating configuration, and in that, in the reduced liquefaction operating configuration, the process comprises, with respect to the maximum or nominal liquefaction operating configuration, a step of reducing at least one flow rate from among: the flow rate of fuel gas produced at the adsorption purification unit outlet, the flow rate of gas produced at the second refrigeration separation unit outlet and the flow rate of fuel gas from the source directly supplying the power plant.

* * * * *